United States Patent Office 3,709,804
Patented Jan. 9, 1973

3,709,804
METHOD OF POLYMERIZATION OF VINYL CHLO-
RIDE AND PRODUCING ITS COPOLYMERS
Vladimir Isaakovich Lukhovitsky, ulitsa Kurchatova 4,
kv. 4; Andrei Mikhailovich Smirnov, ulitsa Kurchatova
2–a, kv. 56; Vladimir Vasilievich Polikarpov, ulitsa
Kurchatovo 10, kv. 29; Alla Mikhailovna Lebedeva,
ulitsa Krasnykh Zor 9, kv. 50; Raisa Mizovna Lagu-
cheva, ulitsa Kurchatova 4, kv. 21; and Vladimir
Lvovich Karpov, ulitsa Komosomolskaya 43, kv. 5, all
of Obninsk, Kalubhaskaya oblast, U.S.S.R.
No Drawing. Filed Dec. 23, 1969, Ser. No. 887,741
Int. Cl. C08f 1/24
U.S. Cl. 204—159.22                7 Claims

ABSTRACT OF THE DISCLOSURE

A method of polymerization and copolymerization of vinyl chloride, according to which emulsion polymerization of vinyl chloride or copolymerization thereof with water-soluble vinyl monomers is carried out under the effect of ionizing radiation in the presence of an ionogenic emulsifying agent taken with a concentration lower than the critical concentration of micelle formation of said emulsifying agent.

---

The present invention relates to the production of polymers and more particularly to a method of polymerization of vinyl chloride and its copolymers.

Polyvinyl chloride and copolymers of vinyl chloride are used as insulation materials in the manufacture of shells for electric conductors and cables, of recording disks, filter cloth, and as starting products for producing varnishes and paints.

There are two industrial methods of producing polyvinyl chloride that have found wide application in the art: a suspension polymerization method and an emulsion polymerization method.

Suspension polymerization of vinyl chloride is carried out in the presence of an initiator soluble in the monomer, water and a colloid.

In accordance with the known suspension method, the process of polymerization of vinyl chloride is effected in drops of the monomer which is dispersed in an aqueous medium by means of intensive stirring. The process is run in the presence of an initiator, such as benzoyl peroxide, and a protective colloid (such as gelatin, polyvinyl alcohol and the like) which prevents agglutination of monomer-polymer particles. The molecules of the protective colloid are arranged in the interface in such a manner that their hydrophobic portions are directed towards the monomer, and their hydrophilic portions are directed towards the water. Therefore the introduction of the colloid results in the formation of a protective layer on the surface of the monomer particles, the particles becoming thus stabilized.

The process is run at a preset temperature and appropriate pressure which are selected in accordance with the desired molecular weight of the polymer to be obtained.

The suspension polymerization of vinyl chloride is disadvantageous in that difficulties are encountered when effecting the process in a continuous fashion.

The known emulsion method of producing polyvinyl chloride consists of polymerizing vinyl chloride in an aqueous solution of an emulsifying agent in the presence of an initiator and buffer mixtures.

The process of emulsion polymerization is intended to pass through the stage at which the monomer is dissolved in the hydrophobic portion of the micelles of the emulsifying agent, where the reaction of growth and termination of the polymer chain takes place. The emulsion polymerization commences not in all the micelles of the emulsifying agent at once, but only in a certain small portion thereof, in which radicals of the emulsifying agent are present, that have formed in the course of its dissolution in water. In the course of polymerization, the micelles of the emulsifying agent become converted into polymer-monomer (latex) particles whose surface is coated with an adsorption layer of the emulsifying agent. Further polymerization proceeds within the latex particles thus formed.

As the emulsifying agent use is made of surface-active agents such as ionogenic and non-ionogenic soaps. Due to the discrete nature of the latex particles, the polymerization process proceeds with a high rate and with the formation of a polymer featuring high molecular weight.

The polymerization product is a stable fine aqueous dispersion of a polymer, which is easy to transfer. This is essential for the process to be run in a continuous manner.

Nevertheless, this method has certain disadvantages, the main disadvantage being a high amount of admixtures in the ready product, namely, residues of the emulsifying agent, electrolyte, and other substances. These admixtures, especially the emulsifying agent, whose content in the final product reaches 3 wt. percent, impair the quality of the polymer, increase its moisture pickup, adversely affect its insulation properties, reduce the transparency of articles made therefrom, their purity and adhesion to metals. Thus, for example, articles made from polyvinyl chloride produced by the emulsion method adsorb up to 5 percent of water, whereas articles made from polyvinyl chloride produced by the suspension method adsorb less than 0.5 percent of water.

It is an object of the present invention to provide an emulsion method of producing polyvinyl chloride under such conditions which will make possible the elimination or an essential reduction of admixtures in the polymer or copolymer, for which the sorbing emulsifying agent is responsible.

This object is attained by a method of producing polyvinyl chloride and its copolymers by way of emulsion polymerization of vinyl chloride or copolymerization thereof with water-soluble vinyl monomers in the presence of an emulsifying agent, which method, according to the invention, consists of that the process is carried out in the presence of an ionogenic emulsifying agent whose concentration is substantially lower than the critical micelle-formation concentration thereof, under the action of ionizing radiation.

As ionizing radiation sources, it is preferable to use gamma sources, since gamma radiation has a higher penetrating power.

It is expedient that the absorbed dose rate should be within 1–100 rad./sec., as this insures effective utilization of radiation sources, reduction in the cost of biological shielding, and enables the process to be run at rates suitable for the given technological schedule.

As an ionogenic emulsifying agent for carrying out the process, use may be made of both, anion-active, and cation-active emulsifying agents, e.g., sodium, potassium, ammonium salts of alkyl sulphonates; potassium, sodium, ammonium salts of fatty acids with the number of carbon atoms from 12 to 18, cetylpyridinium chloride, cetylpyridinium bromide, cetylmethylammonium bromide.

These emulsifying agents, as has been pointed out above, should be taken in concentrations lower than the critical concentration of their micelle formation, within 0.00005–0.6 wt. percent, preferably within 0.001–0.6 wt. percent. The term "critical concentration of micelle formation" is used to denote such concentration, below which the emulsifying agent is in the state of a molecular solution.

For the majority of emulsifying agents, the value of the critical concentration of micelle formation lies within 0.240–0.6 wt. percent.

The method of the present invention is reduced to practice in the following manner:

A reactor equipped with a stirrer is charged with an aqueous solution of said ionogenic emulsifying agent with a concentration of, e.g., 0.00005–0.2 wt. percent. The solution is blown with an inert gas, e.g., with nitrogen, argon or helium for the removal of oxygen, and vacuumized. After that vinyl chloride or its mixture with a water-soluble monomer, such as acrylonitrile, vinyl acetate or vinylidene, is introduced into the solution, and the solution is irradiated by using a source of gamma radiation with a dose rate ranging from 1 to 100 rad/sec. The process of polymerization is carried out with continuous stirring. The irradiation is effected during 1–5 hours, depending on the adopted dose rate. The resulting latex is coagulated by freezing or by adding an electrolyte, with a subsequent drying of the obtained polymer. The drying may be effected in various ways, for example, with the use of a vacuum drier, or by spray drying.

The process of polymerization, and copolymerization of vinyl chloride in the presence of an emulsifying agent of the said concentration, that is, below its critical concentration of micelle formation, and of a substantive initiator, e.g., a mixture of copper sulphate and potassium persulphate, will not proceed, no latex is formed, and a small amount of a block polymer settles on the reactor walls.

The process will not proceed, if a non-ionogenic emulsifying agent is used in said concentration, even in case gamma irradiation is utilized too.

The present method of polymerization of vinyl chloride, as well as copolymerization thereof with other monomers, makes it possible to produce high-purity polyvinyl chloride and copolymers of vinyl chloride due to the fact that the amounts of the emulsifying agent employed in the present method are much smaller than those required in practising the methods known heretofore.

The characteristics of the polyvinyl chloride produced in accordance with our method, such as melting point, heat resistance, dielectric power factor, are better than those featured by industrial specimens, as will be shown hereinbelow.

The present method makes it possible to carry out polymerization and copolymerization of vinyl chloride continuously, since the polymerization process runs in accordance with the emulsion polymerization mechanism with the formation of a latex.

Due to the fact that in the present method use is made of ionizing radiation as the process initiator, the product manufactured in compliance with our method is free from admixtures which otherwise would have been caused by substantive initiators.

For a better understanding of the present invention by those skilled in the art, examples of possible embodiments of the method proposed by us are given hereinbelow by way of illustration.

EXAMPLE 1

An enamel-coated apparatus of 6 l. capacity, equipped with a stirrer, is charged with 4 l. of an aqueous solution of an emulsifying agent which is a mixture of sodium salts of alkyl sulphonate of the general formula $RSO_3Na$, where R is an alkyl group with the number of carbon atoms from 12 to 18, the concentration of the emulsifying agent being 0.005 wt. percent (the critical concentration of micelle formation 0.2 wt. percent).

The solution is blown three times with helium to remove oxygen therefrom, and vacuumized. After that 1 kg. of vinyl chloride is introduced into the solution, and at a temperature of 22–25° C. the mixture is gamma-irradiated with the use of $Co^{60}$, the absorbed dose rate being 70 rad/sec., during 40 min., the mixture being continuously stirred. Yield of polymer was 100 %. Size of latex particles 1000–1500 A. Initial loss in weight point, as determined by the differential thermal analysis, 240° C., M.P. 82° C., dielectric power of factor at 1 kc. p.s. $14.5.10^{-2}$, mol. wt. 106,000, Fickentcher's number $K=84$, volume resistivity $v=8.5.10^{-16}$ ohm. cm.

For comparison we present the characteristics of the polyvinyl chloride, produced by the suspension method by the Japanese firm Nissin. Initial loss in weight point, as determined by the differential thermal analysis, 220° C.; M.P. 72° C.; dielectric power factor at 1 kc. p.s. $16.7.10^{-2}$; Fickentcher's number $K=73$; volume resistivity $v=1.76.10^{15}$ ohm. cm.

As can be seen from these data, our polymer features higher heat resistance and melting point, which fact relates positively to the performance characteristics of articles manufactured from our polyvinyl chloride (an increase in the service life and operation time of the articles under high temperature conditions).

The dielectric power factor in our polymer is lower than in the Japanese specimen, which circumstance confirms smaller amounts of admixtures present in our polymer. The volume resistivity characteristic of our specimen also confirms this fact.

EXAMPLE 2

The process of polymerization is carried out similarly to the procedure described in Example 1, but with the concentration of the emulsifying agent of 0.0005 wt. percent. Irradiation time was 65 min. Polymer yield was 100%.

EXAMPLE 3

The process of polymerization is carried out as in Example 1, but with the concentration of the emulsifying agent being 0.00005 wt. percent. Irradiation time was 120 min. Polymer yield was 100%.

This example is presented for demonstrating the fact, that even in case the amounts of the emulsifying agent are insignificant, the process is carried out with the formation of a latex and at an acceptable rate.

EXAMPLE 4

The process of polymerization of vinyl chloride is carried out as in Example 1, but cetylpyridinium chloride with a concentration of 0.01 wt. percent is used as the emulsifying agent. The process is carried out in a reactor made of stainless steel to preclude coagulation of the latex and sticking of the polymer to the reactor walls. Irradiation time was 40 min. Polymer yield was 100%.

EXAMPLE 5

The process is carried out similarly to Examples 1, 4, but with a dose rate of 4.5 rad/sec. Irradiation time was 160 min. Polymer yield was 100%.

EXAMPLE 6

The process is carried out as in Example 1, but instead of vinyl chloride use is made of a mixture comprising 0.5 kg. of vinyl chloride and 0.5 kg. of acrylonitrile. Irradiation time 100 min. Copolymer yield 100%.

What is claimed is:

1. A method for the emulsion polymerization and copolymerization of vinyl chloride, said method comprising emulsion polymerizing vinyl chloride alone or copolymerizing vinyl chloride in a major amount with one or more water-soluble vinyl monomers with exposure to high energy ionizing radiation in the presence of an ionogenic emulsifying agent having a concentration lower than the critical concentration of micelle formation of said emulsifying agent.

2. A method as claimed in claim 1, wherein the high energy radiation is gamma radiation.

3. A method according to claim 1, wherein the ionogenic emulsifying agent is an anion-active emulsifying agent selected from the group consisting of alkyl sulphonates with the general formula $RSO_3Me$, where Me is Na, K, $NH_4$, and R is an alkyl group with the number of carbon atoms from 12 to 18, salts of fatty acids, with the general formula $RCOOMe$, where Me is Na, K, $NH_4$, and R is an alkyl group with the number of carbon atoms from 12 to 18.

4. A method as claimed in claim 1, wherein the ionogenic emulsifying agent is a cation-active emulsifying agent selected from the group consisting of cetylpyridinium chloride, cetylpyridinium bromide and cetylmethylammonium bromide.

5. A method according to claim 1, wherein the concentration of said emulsifying agent is within 0.00005–0.6 wt. percent.

6. A method as claimed in claim 5, wherein the concentration of said emulsifying agent is from 0.001 to 0.6 wt. percent.

7. A method according to claim 1 wherein ionizing radiation is applied with a dose rate of 1–100 rad/sec.

References Cited
UNITED STATES PATENTS

| | | | |
|---|---|---|---|
| 3,535,292 | 10/1970 | Costrantas et al. | 260—92.8 W |
| 3,311,579 | 3/1967 | Donat | 204—159.22 |
| 2,475,016 | 7/1949 | De Nie | 260—95 C |

JOHN C. BLEUTGE, Primary Examiner

U.S. Cl. X.R.

204—159.23; 260—29.6 R, 29.6 MO, 85.5 XA, 87.5 R, 92.8 W